US006457014B1

(12) United States Patent
Parker (10) Patent No.: US 6,457,014 B1
(45) Date of Patent: Sep. 24, 2002

(54) SYSTEM AND METHOD FOR EXTRACTING INDEX KEY DATA FIELDS (75) Inventor: Christopher F. Parker, Oswego, IL (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/276,994

(22) Filed: Mar. 26, 1999

(51) Int. Cl.[7] .......................... G06F 17/00; G06F 17/30
(52) U.S. Cl. ........................ 707/102; 707/101; 707/2; 707/3
(58) Field of Search ...................... 707/1–4, 7, 102, 707/101, 22, 24; 709/201

(56) References Cited

U.S. PATENT DOCUMENTS

| 5,396,623 | A | * | 3/1995 | McCall et al. | 707/101 |
|---|---|---|---|---|---|
| 5,553,218 | A | * | 9/1996 | Li et al. | 707/102 |
| 5,594,899 | A | * | 1/1997 | Knudsen et al. | 707/2 |
| 5,623,556 | A | * | 4/1997 | Murayama et al. | 382/233 |
| 5,640,194 | A | * | 6/1997 | Suzuki et al. | 348/7 |
| 5,778,353 | A | * | 7/1998 | Schiefer et al. | 707/2 |
| 5,842,197 | A | * | 11/1998 | Ho | 707/2 |
| 6,055,526 | A | * | 4/2000 | Ambroziak | 707/2 |
| 6,112,199 | A | * | 8/2000 | Nelson | 707/4 |
| 6,163,775 | A | * | 12/2000 | Wlaschin et al. | 707/3 |
| 6,167,393 | A | * | 12/2000 | Davis, III et al. | 707/3 |
| 6,236,988 | B1 | * | 5/2001 | Aldred | 707/3 |

FOREIGN PATENT DOCUMENTS

EP  0 336 580 A2 * 10/1989 ........... G06F/15/40

* cited by examiner

Primary Examiner—Safet Metjahic
Assistant Examiner—Uyen Le
(74) Attorney, Agent, or Firm—Baker & McKenzie (57) ABSTRACT A system for extracting index key data fields is provided. The system includes a definition interrogator that extracts index definitions and column definitions from a database. The system also includes a code generator that is connected to the definition interrogator. The code generator builds computer code for extracting index key data fields based upon the index definitions and the column definitions. A table analyzer is connected to the code generator and uses the computer code to extract index data from a data table.

19 Claims, 5 Drawing Sheets

SYSTEM AND METHOD FOR EXTRACTING INDEX KEY DATA FIELDS

FIELD OF THE INVENTION

This present invention relates in general to database management systems and more particularly to a system and method for extracting index key data fields from a data table.

BACKGROUND OF THE INVENTION

A computer database may be characterized as a table having one or more columns of data. Each column of data may have a fixed or variable number of data characters. Each row of the table typically comprises one database record, such that the same number of columns are present in each database record. A column may also be identified as an index key, such that a first index key column is sorted, and a second index key column is then sorted for each occurrence of an entry in the first column. For example, if the first index key column is "states" and the second index key column is "cities," the index will be an alphabetical listing of states in the first column and an alphabetical listing of each city in each state in the second column.

Indices are typically generated for computer databases for a variety of purposes. For example, an index may be generated to allow a user to readily determine relevant groups of data, or to readily determine whether certain classes of data contain other subclasses of data. An index may also be generated if the data storage device for a prior version of the index has been damaged. Further, an index will be generated if the database must be restored from a backed-up version of the database, so as to compare the backed up version with the last known version to ensure data continuity.

Although indices have many important uses, extraction of index key data fields from a database may require significant processing time. Known methods and systems for extracting index key data fields typically check the data stored in each column of each row of the database, even if such data is not an index key. The data may be checked to determine whether it is, for example, a date field, a decimal field, a floating point field, an integer field, a small integer field, a time stamp field, a character field, a graphic field, a variable character field, a variable graphic field, or other fields. Each of these checks requires processor time. Thus, for a database that includes 30 columns of which only three are used for indices, the processor performs at least 90 percent more processing than may be necessary to extract the index key data fields.

Therefore, a system and method for extracting index key data fields from a data table are required that substantially eliminate or reduce the problems associated with conventional systems and methods for extracting index key data fields from a data table.

In particular, a system and method for extracting index key data fields from a data table are required that do not require extensive data processing to be performed on data fields that are not index key data fields.

SUMMARY OF THE INVENTION

In accordance with one embodiment of the present invention, a system for extracting index key data fields is provided. The system includes a definition interrogator that extracts index definitions and column definitions from a database. The system also includes a code generator that is connected to the definition interrogator. The code generator builds computer code for extracting index key data fields based upon the index definitions and the column definitions. A table analyzer is connected to the code generator and uses the computer code to extract index data from a data table.

The present invention provides many advantages. One advantage of the present invention is a method and system for index key extraction that optimizes the use of processor resources for extracting index keys from table data. The present invention decreases the use of processor resources by skipping unneeded characters in a data record or table row when extracting index keys, and does not analyze the characters to determine or verify that they comprise a certain type of data.

Another advantage of the present invention is a system and method for index key extraction that increases the speed of index key extraction. The present invention extracts index and column field definitions, and uses these extracted definitions to analyze database tables in a manner that is quicker than prior art methods.

BRIEF DESCRIPTION OF THE DRAWINGS

An embodiment of the invention will be described hereinafter, by way of example only, with reference to the accompanying drawings in which like reference numbers are used for like features and in which.

DETAILED DESCRIPTION

Figure 1:
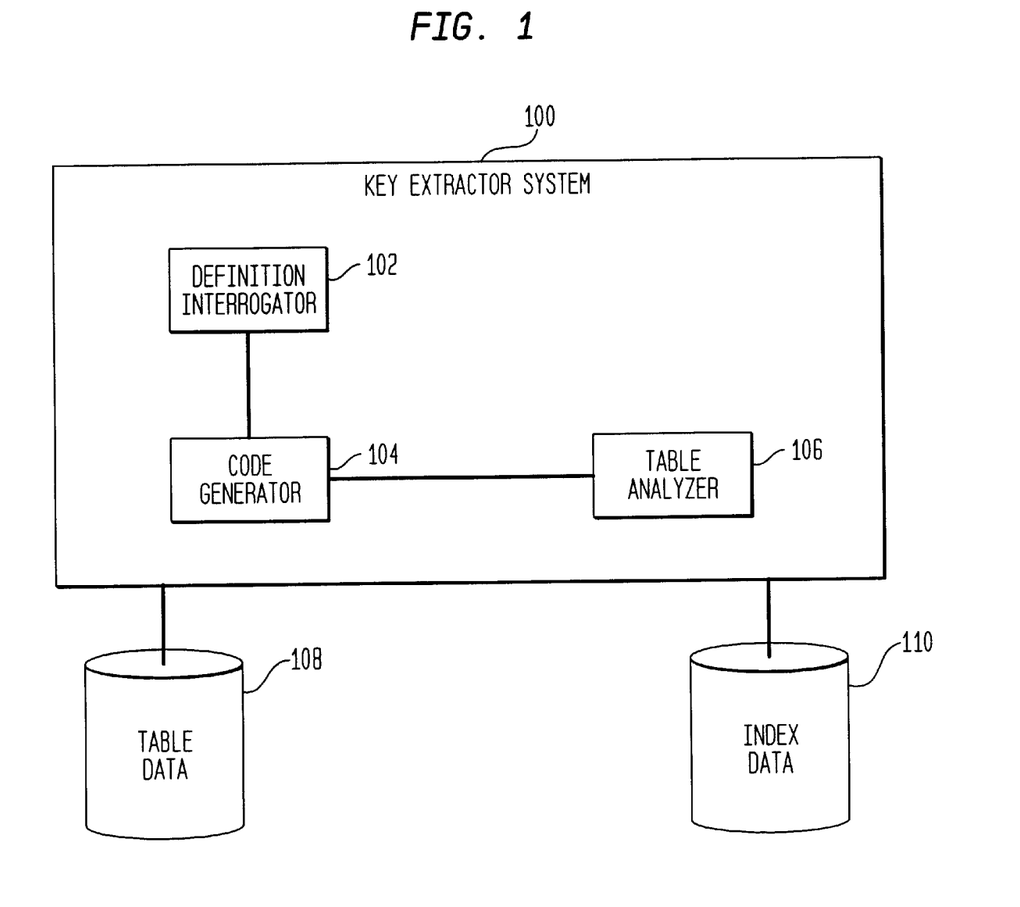
FIG. 1 is a block diagram of an exemplary key extractor system embodying concepts of the present invention.

FIG. 1 is a block diagram of an exemplary key extractor system 100 embodying concepts of the present invention. Key extractor system 100 may be implemented in hardware, software, or a suitable combination of hardware and software. Key extractor system 100 is preferably used in a DB2 database system that is configured for processing data in a DB2-compatible database, but may also or alternatively be used in other suitable database systems.

Key extractor system 100 includes definition interrogator 102, code generator 104, and table analyzer 106. Key extractor system 100 is coupled to table data storage device 108 and index data storage 110. For example, key extractor system 100 may be coupled by a physical connection such as a conductor, a virtual connection such as by referencing data stored in a predetermined buffer or location, a logical connection such as through logical devices of a processor, or through other suitable connections. Key extractor system 100 is operable to interrogate table, column, and index definitions, and generates code by which to analyze the table so as to extract index key data fields. Key extractor system 100 also executes the generated code so as to extract the data index key data fields for an index when necessary, such as when index data storage device 110 has failed, or whenever a table stored on table device 108 is recovered.

Definition interrogator 102 may be implemented in hardware, software, or a suitable combination of hardware and software. Definition interrogator 102 is preferably operating code that is designed to operate on a general purpose computer such as a mainframe, a work station, a personal computer, or other suitable processors. Definition interrogator 102 is configured to interrogate a database in order to extract table, column, and index definitions. For example, definition interrogator 102 may interface with a DB2 catalog which stores data field definitions for database index key data fields and other suitable data. Definition interrogator 102 is configured to extract table, index, and column definitions that are required by code generator 104 to generate code to automatically extract index key data fields from databases or table data.

Code generator 104 may be implemented in hardware, software, or a suitable combination of hardware and software. Code generator 104 is preferably software such as operating code that is designed to operate on a general purpose computer such as a mainframe, a work station, a personal computer, or other suitable processors. Code generator 104 receives definitions for the database index key data fields from definition interrogator 102 and generates code that will be used to analyze the table data so as to extract index key data fields. For example, code generator 104 may receive the following information from definition interrogator 102:

Table—8 columns

Index 1 [column 6, column 2]

Index 2 [column 3, column 8]

Code generator 104 then orders the column and index definitions so as to generate code for extracting index key data fields from the table data. For example, the column definitions may comprise the following:

column 1—5 characters, fixed column 2—10 characters, fixed column 3—10 characters, variable, plus 4 character size field column 4—10 characters, variable, plus 4 character size field column 5—8 characters, fixed column 6—7 characters, fixed column 7—6 characters, variable, plus 4 character size field column 8—9 characters, variable, plus 4 character size field Code generator 104 would generate the following exemplary pseudo code in response to the above definitions:

READ ROWS OF DATA read column 2=characters at columns (column 1+1) through (column 1+column 2)

read column 3=characters at columns (column 1+column 2+5) through (column 1+column 2+5 plus size(column 3)

read column 6=characters at columns (column 1+column 2+4+size(column 3)+4+size (column 4)+9) through (column 1+column 2+4+size(column 3)+4+size (column 4)+16) read column 8=characters at columns (column 1+column 2+4+size(column 3)+4+size (column 4)+16+4+size(column 7)+5) through (column 1+column 2+4+size(column 3)+4+size (column 4)+16+4+size(column 7)+5+size(column 8)

WRITE INDICES TO WORK SPACES

Write (column 6, column 2) to index 1 workspace

Write (column 3, column 8) to index 2 workspace

One of ordinary skill in the art will recognize that the above pseudo code is exemplary, and that code generator 104 may be adapted as suitable to generate code that can be used to analyze table data in accordance with teachings of the present invention.

In general, code generator 104 generates code to read characters in a database record or table row, where the database record or table row is broken up into a predetermined number of columns. Code generator 104 generates code to read data fields having a fixed or variable number of characters, based upon the location of the data fields relative to the beginning of the database record and relative to other data fields. Code generator 104 generates code for skipping a predetermined number of characters, for determining and skipping the number of characters in a variable data field, or for skipping a combination of fixed and variable data fields. Code generator 104 also generates code for reading a fixed or variable data field, and for writing the data field to a work space with other data fields so that the data fields may be sorted to form an index.

Table analyzer 106 is coupled to code generator 104. Table analyzer 106 may be implemented in software, hardware, or suitable combination of hardware and software. Table analyzer 106 is preferably operating code that is designed to operate on a general purpose computer such as a mainframe, a work station, a personal computer, or other suitable processors. Table analyzer 106 is operable to receive the code generated by code generator 104 and to execute the code so as to analyze table data and to extract index key data fields from the table data. For example, table analyzer 106 may be used to extract index key data fields from table data stored on table storage device 108 after the index data storage device 110 has failed, so as to regenerate the index data. In that situation, key extractor system 100 would be required to store the index data on a backup index data storage device 110.

Likewise, table analyzer 106 may be used to generate table data whenever a table is recovered. For example, table data storage device 108 may be backed up daily and inadvertently corrupted by system failure, improper backup procedures, incorrect backup data, or other error sources. In that situation, it may be necessary to backup table data on table data storage device 108 to previous backup versions, and then to verify that the previous backup versions have not been corrupted. One method of performing this verification is to compare index data from the backup table with the most recent index data. Table analyzer 106 may be used to extract the index data from such backup table data.

In operation, key extractor system 100 is activated in order to analyze table data. Key extractor system 100 first activates definition interrogator 102, which receives database index key data from a suitable data storage area, such as a DB2 catalog. Code generator 104 receives the definitions from definition interrogator 102 and generates code that may be used to analyze table data. Table analyzer 106 receives the code generated by code generator 104 and analyzes table data to extract index key data fields. In this manner, key extractor system 100 may be optimized for index key extraction as compared with prior art methods and systems for index key extraction that use generic code that is not based on definitions received from a definition interrogator.

Figure 2:
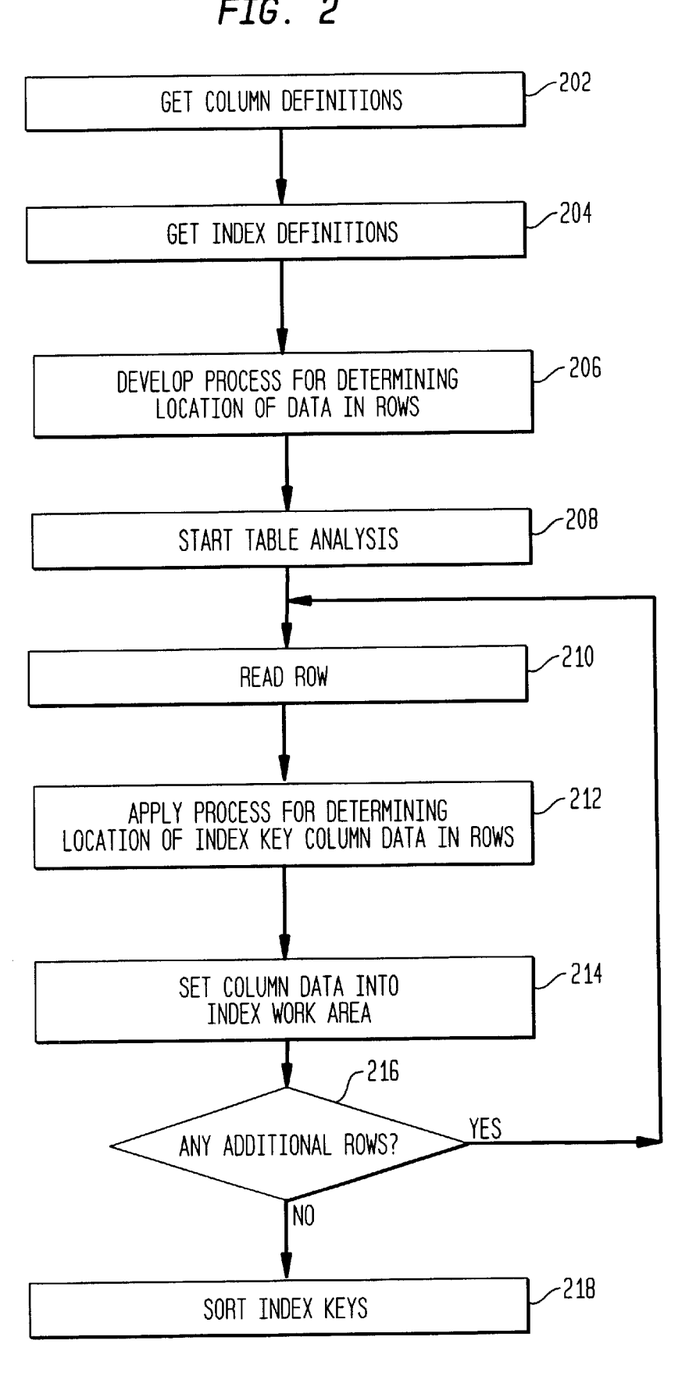
FIG. 2 is a flow chart of an exemplary method for extracting index key data fields in accordance with teachings of the present invention.

FIG. 2 is a flow chart of an exemplary method 200 for extracting index key data fields in accordance with teachings of the present invention. Method 200 is preferably used in conjunction with a DB2 database system or method that is configured for processing data in a DB2-compatible database, but may also or alternatively be used in other suitable database systems or methods.

Method 200 begins at step 202 where column definitions are extracted from a data storage area, such as a DB2 catalog. The method then proceeds to step 204 where index definitions are extracted from a data storage area, such as a DB2 catalog. The method then proceeds to step 206 where a process is developed for determining the location of data fields in database records that are organized as rows of table data. For example, column definitions may include ten data field columns that define each of the rows of a database table. The column definitions may include fixed and variable fields. The index definitions include the column data field identifiers that are used to generate indices for the table.

For example, the third and the fifth columns of the ten columns of data may be used to generate an index, where the third column is sorted first and the fifth column is sorted second. In this manner, all data fields in the fifth column having identical data fields in the third column may be easily determined by referencing the index. The formula for determining the location of data fields in rows that correspond to columns of data is based upon the fixed and variable column definitions retrieved at step 202. Write commands are generated at step 206 to write the retrieved data fields to a workspace such that the column data may be sorted to generate the index data. The method then proceeds to step 208.

At step 208, table analysis is initiated. For example, table analysis may be initiated when an existing index of a table has been corrupted or when the table data has been corrupted requiring verification of a backup version of the table data. The method proceeds to step 210 where the first row of table data is read. For example, the table data will typically consist of rows of data that are arranged into column fields of data. After the first row is read at step 210, the method proceeds to step 212 where the process for determining the location of the index key column data in the row of data is applied to the row of data.

For example, it may be determined at steps 202 through 206 that columns 1, 2, 3, 5, 7, and 10 are columns having fixed dimensions, that columns 4, 6, 8, and 9 are columns having a variable size. Furthermore, it may be determined that columns 4, 6, 9, and 10 should be written to a workspace for sorting and preparation as an index. The row of data would then be analyzed at step 212 such that a pointer is first moved to the next character past the number of characters equal to the sum of the number of characters in the first three columns. The size of the variable fourth column would then be read, the pointer would be moved to the next character beyond the fourth column, and the data in the fourth column would be read and written to the workspace.

The pointer would then be moved forward an appropriate number of characters equal to the number of characters in the fifth column, and the size of the variable sixth column would then be read. The pointer would then be moved to the next character beyond the sixth column, and the data in the sixth column would be read and written to the workspace. The above steps would then be repeated to move the pointer past the seventh and eighth columns, and to read and write the data in the ninth and tenth columns.

After the last index key is read, the method proceeds to step 214 where the column data for the last index key is set into the workspace. The method then proceeds to step 216 where it is determined whether there are any additional rows that must be read. If additional rows are present, the method returns to step 210 where the next row is read. Otherwise, the method proceeds to step 218 where the index key data that has been stored in the index work area is sorted. In an example where the index has three keys, the first key is used to sort all database records. The second key is then used to sort all remaining database records that have an identical first key, and the third key is used to sort all remaining database records that have an identical second key.

In this example, consider a first key of state, a second key of city, and a third key of order number. The first sort would then be used to arrange all of the rows or database records according to the state data field, then to arrange all order numbers according to the city data field. The database records will then be arranged so that the order numbers are in order. The sort order may be alphabetical, alphanumeric increasing, alphanumeric decreasing, or other suitable orders.

In operation, method 200 is used to extract index key data fields and to process table data so as to generate an index. Method 200 bypasses unnecessary steps that may be present in known methods for processing index key data fields, and thus decreases processing time and optimizes performance of index key extraction and index generation programs.

Figure 3:
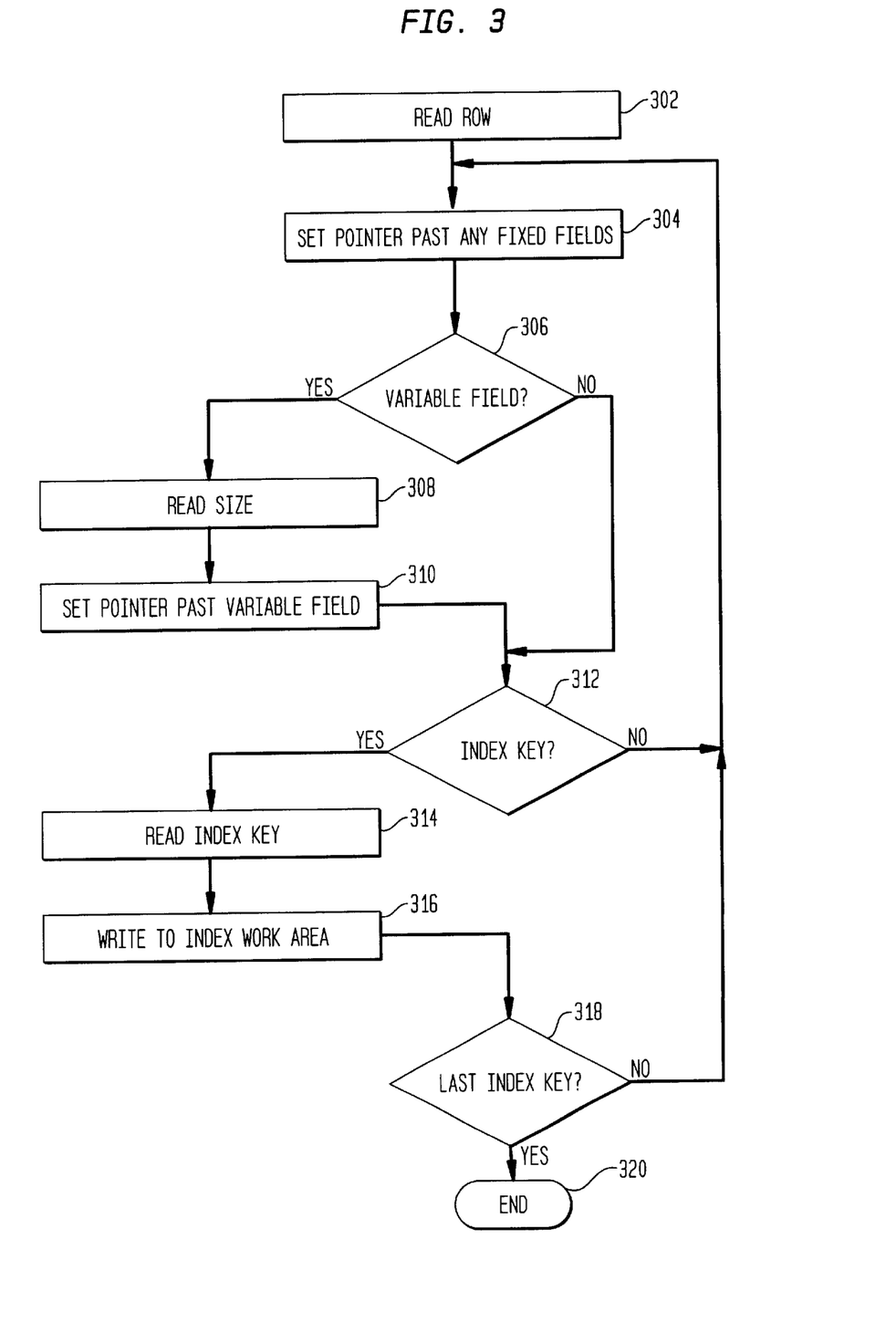
FIG. 3 is a flow chart of a method for processing row data in accordance with teachings of the present invention.

FIG. 3 is a flow chart of an exemplary method 300 for processing row data in accordance with teachings of the present invention. Method 300 may be implemented alone, at step 212 of method 200, or with other suitable methods to read and process table row data so as to extract index keys. Method 300 is preferably used in a DB2 database system or method that is configured for processing data in a DB2-compatible database, but may also or alternatively be used in other suitable database systems or methods.

Method 300 begins at step 302, where a table row of data is read from a data storage area into a data memory, buffer, or other suitable location. The method then proceeds to step 304, where a pointer is set past any fixed fields as determined from an analysis of the column and table definitions. Using the example presented in the discussion of FIG. 1, the pointer would be set past any row header data and the 5 fixed characters of the first column. The method then proceeds to step 306.

At step 306, it is determined whether the next field is a variable field. In the example, the next field is a fixed field, so the method would proceed to step 312. At step 312, it is determined whether the next field is an index key. In the example, column 2 is an index key, so the method proceeds to step 314 where the index key is read. The index key is then written to an index work area at step 316. The index work area is a data memory area that has been allocated for processing of the index data. The method then proceeds to step 318, where it is determined whether the last index key has been processed for the row. In the example, column 2 is not the last index key, so the method returns to step 304.

At step 304, it is determined whether the next field is a fixed field. In the example, the next field is column 3, which is a variable field. The method then proceeds to step 306, where it is determined whether the field is a variable field, and the method proceeds to step 308. At step 308, the size field of the variable field is read. The method then proceeds to step 310, where the pointer is set to the next character past the variable field.

After the pointer is set at step 310, the method proceeds to step 312 where it is determined whether the column data field is an index key. In the example, column 3 is an index key, so the method proceeds to step 314 where the index key field is read. The index key field is then written to the work area at step 316, and the method proceeds to step 318. The remaining columns are processed in a similar manner until the last index key is processed. After it is determined that the last index key has been processed at step 318, the method proceeds to step 320 and terminates.

In operation, method 300 is used to process rows of table data to extract index keys. Method 300 uses table and column definitions that identify the number of columns of data in the rows of table data, the size of the columns, and the columns that contain index keys, in order to extract the index keys and write them to a workspace. Method 300 may be used to process a suitable combination of columns and index keys, such that any number of variable and fixed column data fields may be interposed between the beginning of the row of table data, the first index key, and any additional index keys.

Figure 4A:
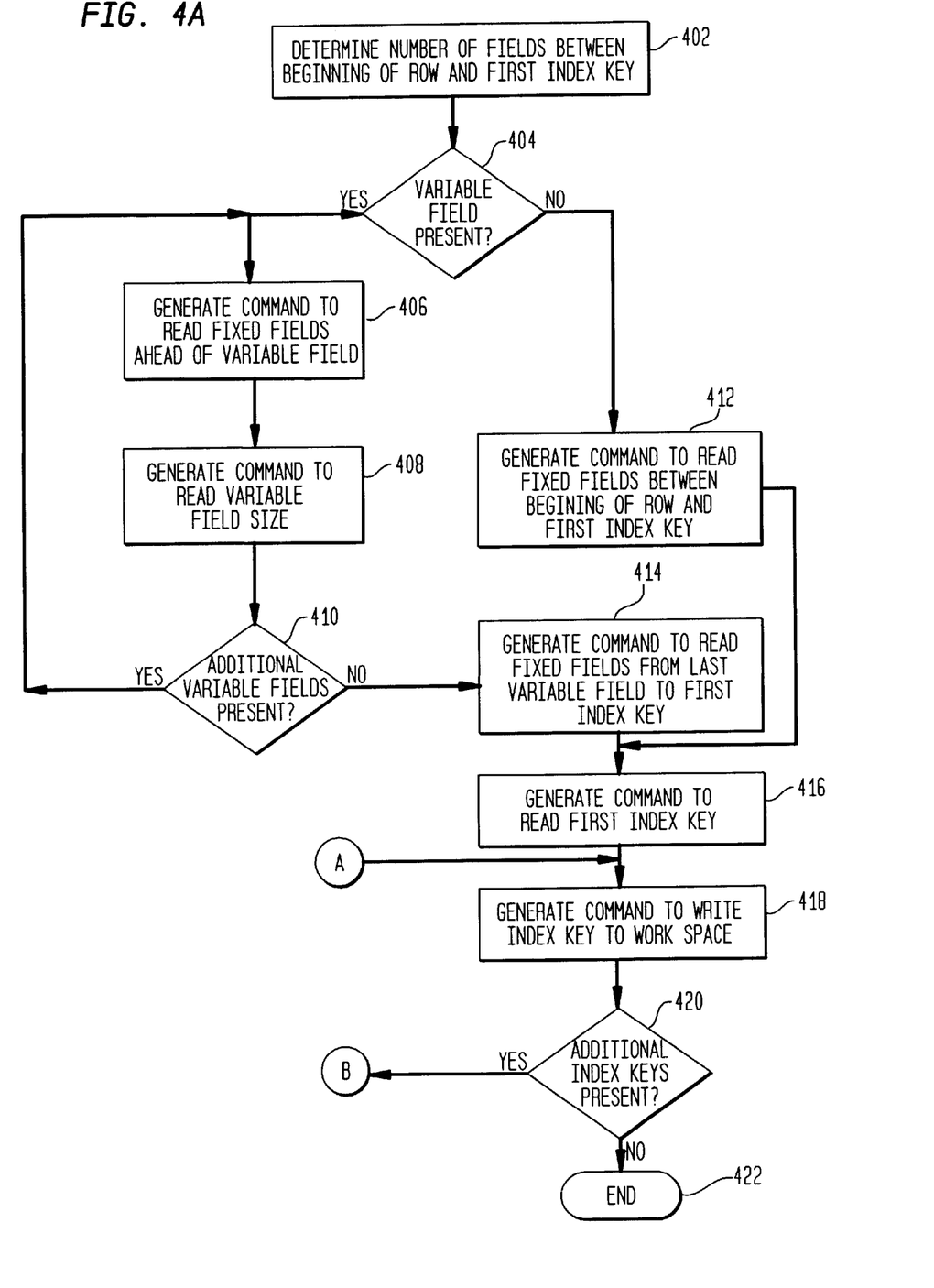
FIGS. 4a and 4b are a flow chart of an exemplary method for developing a formula to extract index key data from table data in accordance with teachings of the present invention.
Figure 4B:
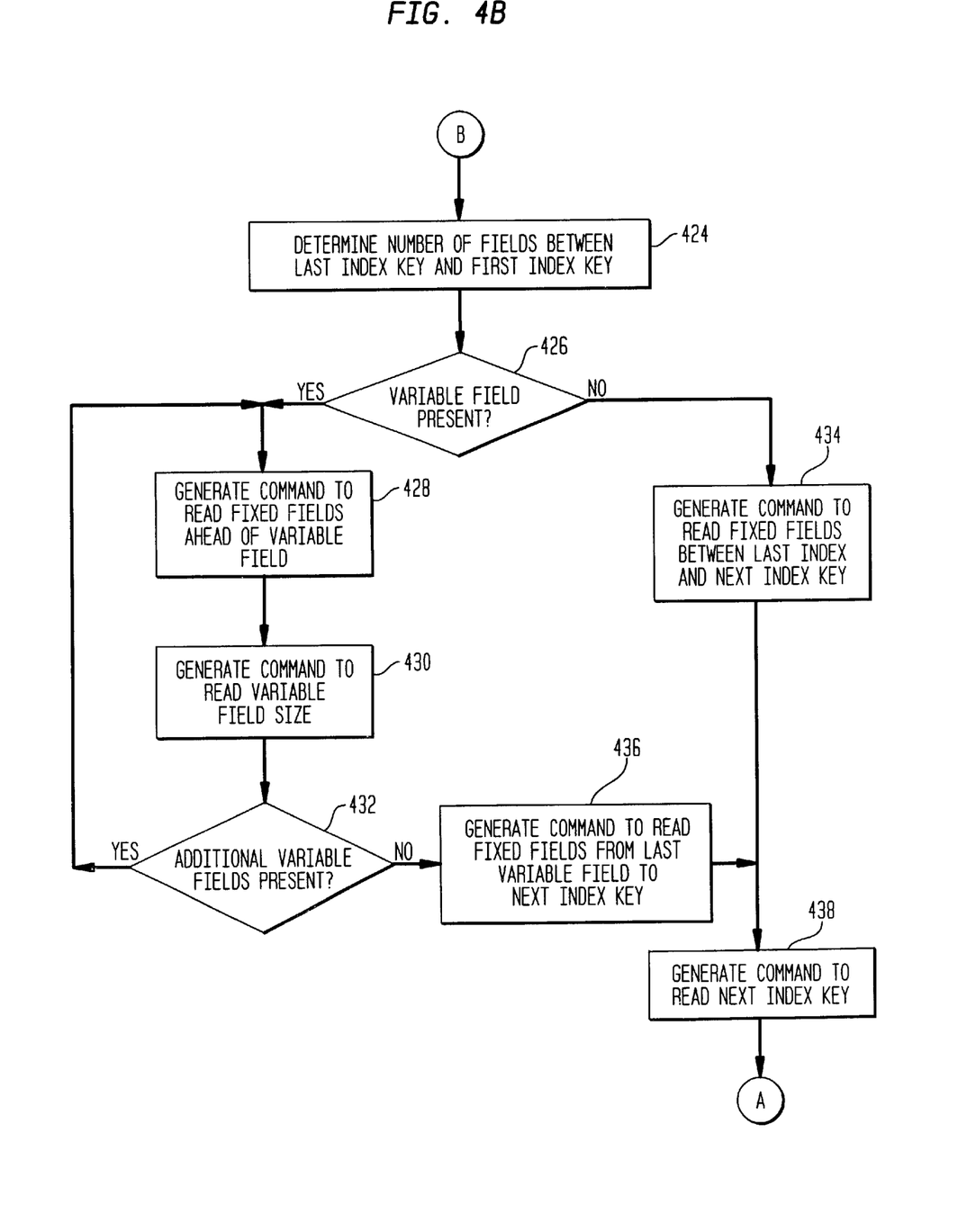

FIGS. 4a and 4b are a flow chart of an exemplary method 400 for developing a formula to extract index key data from table data in accordance with teachings of the present invention. Method 400 is preferably used in a DB2 database system or method that is configured for processing data in a DB2-compatible database, but may also or alternatively be used in other suitable database systems or methods.

Method 400 begins with step 402, where the number of data fields between the beginning of a row and the first index key are determined. The method then proceeds to step 404 where it is determined whether any of the data fields are variable data fields. If any of the data fields are variable data fields, then the method proceeds to step 406 where a command is generated to read all of the fixed data fields that are ahead of the variable data field in the row. The method then proceeds to step 408 where a command is generated to read the variable data field size field. For example, variable data fields typically include one or more characters that define the size of the variable data field, such that the variable data field having a null size will still have one or more characters that define the field as a null field. The method then proceeds to step 410 where it is determined whether additional variable data fields are present. If additional variable data fields are present, the method returns to step 406, otherwise the method proceeds to step 414.

At step 414, a command is generated to read the fixed data fields that may exist between the last variable data field and the first index key data field. The method then proceeds to step 416. If no variable data fields are present at step 404, the method proceeds to step 412. At step 412 a command is generated to read the index key data field starting at the first character past the fixed data fields that occur between the beginning the row and the first index key data field. The method then proceeds to step 416.

At step 416, a command is generated to read the first index key data field. For example, the first index key data field may be a fixed or variable column. If the first index key data field is a variable data field, additional commands will be generated to analyze the variable field size field so as to determine the number of characters in the variable field that comprises the first index key data field. The method then proceeds to step 418 where a command is generated to write the index key data field to an index work space.

After the index key command is generated at step 418, the method proceeds to step 420 where it is determined whether additional index key data fields are present. Typically, an index will require at least one index key data field, and the method will proceed to step 424 only if two or more index keys are utilized. If all index key data fields have been extracted, then the method proceeds to step 422 and terminates.

At step 424, the number of data fields between the last index key data field and the next index key data field are determined. The method then proceeds to step 426, where it is determined whether any of the data fields are variable fields. If variable data fields are present, then the method proceeds to step 428, where a command is generated to read all of the fixed fields that occur ahead of the variable field.

After the command is generated at step 428, the method proceeds to step 430 where a command is generated to read the variable data field size field. Another command is generated to read the variable data field based upon the number of characters read from the variable data field size field. The method then proceeds to step 432, where it is determined whether additional variable data fields are present. If additional variable data fields are present, the method returns to step 428. Otherwise, the method proceeds to step 436, where a command is generated to read the next index key data field starting at the first character after the fixed data fields from the last variable data field to the next index key data field. The method then proceeds to step 438.

If it is determined at step 426 that no variable fields are present, the method proceeds to step 434, where a command is generated to read the number of fixed fields that occur between the last index key and the next index key data field. The method then proceeds to step 438. At step 438, a command is generated to read the next index key data field. For example, the index key may comprise a fixed or variable field. If the index key data field comprises a variable data field, additional commands will also be generated to read the variable data field size field, and to then determine the number of characters in the variable data field. The method then returns to step 418, where a command is generated to write the index key data field to a work space.

Method 400 is used to generate code for analyzing a table, such as by code generator 104 of FIG. 1. Method 400 results in code that is optimized for a particular table, such that columns and fields not necessary for index extraction are bypassed and do not need to be analyzed. In this manner, method 400 increases the speed at which an index is extracted from a table, which further results in a decrease in the amount of processor resources that must be used to extract the index key data fields.

Although a particular embodiment has been described herein, it will be appreciated that the invention is not limited thereto and that many modifications and additions thereto may be made within the scope of the invention as defined by the following claims.

What is claimed is:

1. A method for extracting index key data fields comprising;
   interrogating a predefined index definition that includes at least one column identifier as an index key;
   interrogating at least one column definition to identify at least a position of a column in a row of a database table;
   generating computer code instructions to automatically extract index key data associated with the index key based on the predefined index definition and the at least one column definition, the computer code instructions including instructions to slip reading a selected number of characters in a database table to locate the index key data.

2. The method of claim 1 further comprising:
   extracting index key data from a table using an algorithm in the computer code instructions; and
   storing the index key data into an index workspace.

3. The method of claim 2 further comprising sorting the index key data in the index workspace after all of the index key data has been extracted from the table.

4. The method of claim 1, wherein interrogating the predefined index definition comprises interrogating the index definition from a DB2 catalog.

5. The method of claim 1 wherein interrogating at least one column definition comprises interrogating at least one column definition from a DB2 catalog.

6. The method of claim 1, wherein generating computer code instructions comprises:

determining the number of fixed and variable data fields that separate each index key;

generating one or more commands to extract each index key from the fixed and variable data fields that separate each index key; and     generating one or more commands to write the index key data into an index work space.

7. A method for extracting index key data fields comprising:

generating computer code instructions to automatically extract key data fields, the computer code instructions including,     determining first and second index key from a predefined index definition for extracting index key data fields associated with the first and second index key;

determining a first block of fixed and variable data fields;

extracting the first index key which occurs after the first block of fixed and variable data fields by skipping a selected number of characters comprising the first block of fixed and variable data fields;

writing the first index key to a workspace;

determining a second block of fixed and variable data fields;

extracting the second index key which occurs after the second block of fixed and variable data fields by skipping a selected number of characters comprising the second block of fixed and variable data fields; and     writing the second index key to the workspace.

8. The method of claim 7 wherein determining the first block of fixed and variable data fields comprises:

determining a location of a variable data field size field by adding a number of characters for all fixed fields preceding the variable data field size field;

reading the variable data field size field; and adding the number of variable data characters to the first block of fixed and variable data fields.

9. The method of claim 8 further comprising repeating the steps of determining the location of the variable data field size field, reading the variable data field size field, and adding the number of variable data characters to the first block of fixed and variable data fields for each variable data field between the first character in a row and the first index key.

10. The method of claim 7 wherein determining the second block of fixed and variable data fields comprises:

determining a location of a variable data field size field by adding the number of characters for all fixed fields following the first index key data field and preceding the variable data field size field;

reading the variable data field size field; and adding the number of variable data characters to the second block of fixed and variable data fields.

11. The method of claim 10 further comprising repeating the steps of determining the location of the variable data field size field, reading the variable data field size field, and adding the number of variable data characters to the fixed and variable data fields for each variable data field between the first index key data field and the second index key data field.

12. The method of claim 7 further comprising repeating the steps of determining an additional predetermined number of fixed and variable data fields, extracting an additional index key, and writing the additional index key to the workspace for each of one or more additional index key data fields.

13. The method of claim 7 wherein determining the first block of fixed and variable data fields comprises:

interrogating an index definition that includes two or more column identifiers;

interrogating two or more column definitions, wherein each column definition corresponds to a fixed or variable data field; and     determining the number of characters between a first character in a row and a first index key data field.

14. The method of claim 7 wherein determining the second number of fixed and variable data fields comprises:

interrogating an index definition that includes two or more column identifiers;

interrogating two or more column definitions, wherein each column definition corresponds to a fixed or variable data field; and     determining the number of characters between a first index key data field and a second index key data field.

15. A system for extracting index key data fields comprising:

a definition interrogator operable to extract predefined index definitions and column definitions from a database;

a code generator coupled to the definition interrogator, the code generator operable to build computer code for automatically extracting index key data fields based upon the predefined index definitions and the column definitions, the computer code including instructions to skip a selected number of characters in a data table to read index key data fields; and     a table analyzer coupled to the code generator, the table analyzer operable to use the computer code to extract index key data fields from the data table to automatically recover index key data fields.

16. The system of claim 15 wherein the a definition interrogator is operable to extract index definitions and column definitions from a DB2 catalog.

17. The system of claim 15 wherein the code generator further comprises:

a fixed field code generator, wherein the fixed field code generator generates code that causes a processor to skip a field having a predetermined number of characters; and     a variable field code generator, wherein the variable field code generator generates code that causes the processor to skip a field having a variable number of characters.

18. The system of claim 17 wherein the variable field code generator generates code that causes the processor to locate a size field and to skip the number of characters corresponding to the value stored in the size field plus the number of characters of the size field.

19. The system of claim 17 wherein the table analyzer further comprises a processor coupled to the code generator, the table analyzer operable to use the computer code to extract index data from a data table.

\* \* \* \* \*